No. 878,107. PATENTED FEB. 4, 1908.
H. YARNELL.
SUPPLEMENTAL DETACHABLE VEHICLE TIRE.
APPLICATION FILED DEC. 12, 1906.
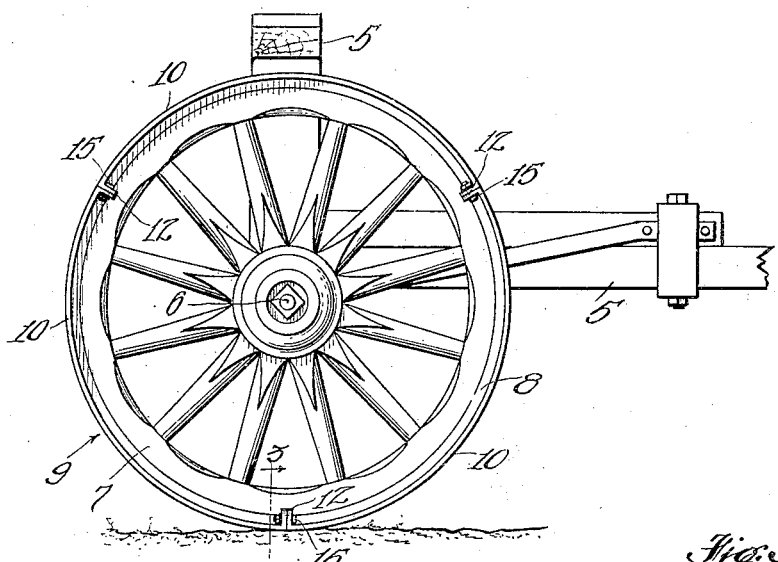
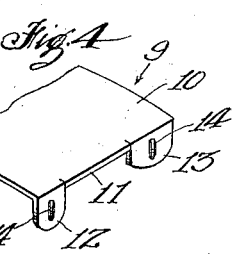
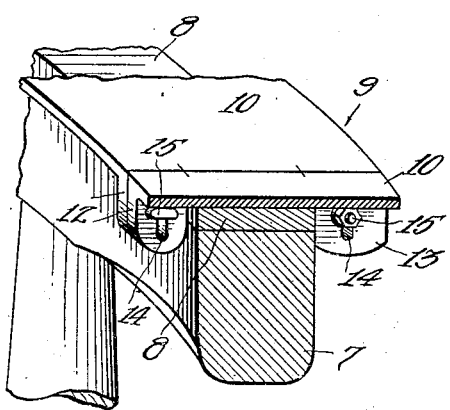
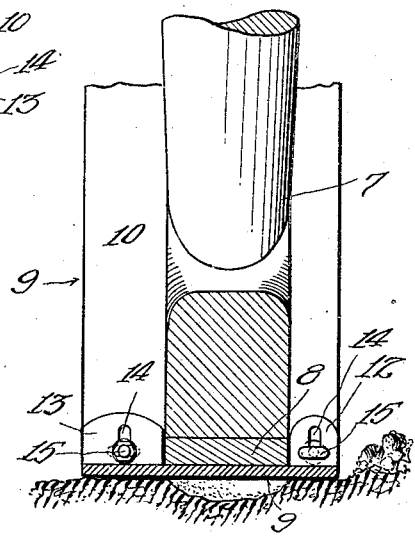
Witnesses
Inventor
Harrison Yarnell
By Hazard & Harpham,
Attorneys

UNITED STATES PATENT OFFICE.

HARRISON YARNELL, OF LOS ANGELES, CALIFORNIA.

SUPPLEMENTAL DETACHABLE VEHICLE-TIRE.

No. 878,107.   Specification of Letters Patent.   Patented Feb. 4, 1908.

Application filed December 12, 1906. Serial No. 347,435.

*To all whom it may concern:*

Be it known that I, HARRISON YARNELL, a citizen of the United States, residing at Los Angeles, in the county of Los Angeles and State of California, have invented new and useful Improvements in Supplemental Detachable Vehicle-Tires, of which the following is a specification.

My invention relates to a sectional supplemental vehicle tire designed especially for use on wagons or heavy vehicles, and an object thereof is to provide a tire by means of which a heavy load can be drawn through sandy or boggy soils with the minimum expenditure of power.

Oftentimes in crossing desert countries where the soil is unusually sandy it is almost impossible to draw heavy loads in vehicles equipped with the ordinary tire, as the sandy soil allows the wheels to become locked therein, thereby rendering the vehicle extremely hard to move. By the use of my removable broad tires the wheels are prevented from sinking into the soil, thereby facilitating the movement of the vehicle. I accomplish this object by means of the device described herein and illustrated in the accompanying drawings, in which—

Figure 1.—is a side elevation of a portion of a vehicle showing my device applied to one of its wheels. Fig. 2.—is a sectional perspective view of a portion of a vehicle wheel equipped with my device, and showing the means of locking it to the wheel. Fig. 3.—is a cross section taken on line 3—3 of Fig. 1. Fig. 4.—is a detail perspective view of one end of one of the supplemental tire sections.

Referring to the drawings, 5 designates the running gear of a vehicle, 6 the axle, and 7 the wheel revolubly mounted thereon. The wheel 7 is provided with the usual steel tire 8 to which is secured my improved supplemental tire 9. This tire is preferably composed of a number of segmental sections 10, each of the ends being notched as at 11 and the ends 12 and 13 turned at right angles thereto so as to form tongues. These tongues are provided with slots 14 through which are adapted to pass when the tire is in place on the wheel, T-bolts 15. The notches 11 are at one side of the longitudinal median line of the sections so that the greater portion of the tread of the supplemental tire is on the inner side of the wheel. The purpose of having the greater portion of the supplemental tread on the inside of the wheels is to provide for narrow roads thereby eliminating any danger of their being bent or injured, as the inner portion of the road is usually level. The tongues 12 and 13 of the segmental sections when the supplemental tire is in place on the wheel prevent any lateral movement.

In practice, the sections 10 can be made of graduated lengths so that when they are detached from the wheel they may be nested together so as to form a compact mass that will occupy little space. As will be noted the supplemental tires may be put on or detached at will according to the character of the road or country over which the vehicle is passing.

Having described my invention what I claim as new and desire to secure by Letters Patent is:—

1. A supplemental tire for vehicle wheels comprising a plurality of segmental sections, each having notched ends, the notches being cut non-medially of the sections and the ends formed by the notches constituting attaching tongues; and means for securing the tongues of the abutting sections together to form a continuous tire.

2. A supplemental tire for vehicle wheels comprising a plurality of integral segmental sections, each having notched ends, the notches being cut non-medially of the sections and the ends formed by the notches constituting attaching tongues; and means for securing the tongues of the abutting sections together to form a continuous tire.

3. A supplemental tire for vehicle wheels comprising a plurality of segmental sections having their ends bent inwardly and having non-medial end notches cut in said bent portions; said notched bent ends adapted to straddle an ordinary tire and to form attaching tongues.

In witness that I claim the foregoing I have hereunto subscribed my name this 6th day of December, 1906.

HARRISON YARNELL.

Witnesses:
EDMUND A. STRAUSE,
G. E. HARPHAM.